United States Patent [19]
Cooperman et al.

[11] Patent Number: 5,862,128
[45] Date of Patent: Jan. 19, 1999

[54] MERGED BUFFER SIGNAL SWITCH

[76] Inventors: Michael Cooperman, Seven Blueberry Cir., Framingham, Mass. 01701; Nee-Ben Gee, 36 Rosalie Rd., Needham, Mass. 02194; John Edmund Rathke, 35 Hamilton Rd., Waltham, Mass. 02154

[21] Appl. No.: 580,804

[22] Filed: Dec. 29, 1995

[51] Int. Cl.$^6$ ............................................. H04J 3/14
[52] U.S. Cl. .................................... 370/236; 370/229
[58] Field of Search ................................ 370/411, 412, 370/413, 414, 417, 418, 229, 230, 231, 232, 235, 236, 237

[56] References Cited

U.S. PATENT DOCUMENTS

| | | | |
|---|---|---|---|
| 4,603,416 | 7/1986 | Servel et al. | 370/417 |
| 4,754,451 | 6/1988 | Eng et al. | 370/417 |
| 4,760,570 | 7/1988 | Acampora et al. | 370/417 |
| 4,829,475 | 5/1989 | Ward et al. | 365/49 |
| 4,862,412 | 8/1989 | Fried et al. | 365/49 |
| 5,130,947 | 7/1992 | Reed | 365/227 |
| 5,268,896 | 12/1993 | Pauwels | 370/413 |
| 5,301,055 | 4/1994 | Bagchi et al. | 359/139 |
| 5,345,229 | 9/1994 | Olnowich et al. | 340/825.8 |
| 5,367,520 | 11/1994 | Cordell | 370/395 |
| 5,404,537 | 4/1995 | Olnowich et al. | 370/388 |
| 5,406,554 | 4/1995 | Parry | 370/381 |
| 5,471,468 | 11/1995 | Sandin et al. | 370/389 |
| 5,506,809 | 4/1996 | Csoppenszky et al. | 365/221 |
| 5,511,070 | 4/1996 | Lyles | 370/411 |

(List continued on next page.)

OTHER PUBLICATIONS

Schultz et al, "CAM–Based Single–Chip Shared Buffer ATM Switch," 1994 International Communication Conference pp. 1190–1195 (1994).

Schultz et al., "Fully–Parallel Multi–Megabit Integrated Cam/Ram Design", 1994 IEEE, pp. 46–51 (1994).

*Primary Examiner*—Douglas W. Olms
*Assistant Examiner*—Ajit Patel
*Attorney, Agent, or Firm*—Leonard C. Suchyta

[57] ABSTRACT

A signal switch with merged buffer architecture has multiple input ports connected to a circuit switch matrix which partially sorts the input signals based on output port destination. The circuit switch matrix is connected to multiple merged buffers, each in turn connected to a corresponding output port and feedback. Input signals entering the circuit switch matrix are normally sent to the buffer attached to the destination output port of the input signal, but, if more than one input signal is contending for an output port, all but the first contending input signal are misrouted to merged buffers that are not busy. The location in memory of all of the correctly routed and misrouted input signals in the switch is tracked by a control, which also routes input signals to their output port destinations from the merged buffers, and reroutes misrouted input signals to the correct buffers. The control does not reroute a misrouted signal until its intended buffer is no longer busy, so that each input signal is rerouted at most once. The control can also track the priority, sequence number, and output port destination of each input signal, in order to give preference to the higher priority input signals going to a particular output port. Buffer overflow can be minimized and switch resources more efficiently utilized by denying rerouted input signals access to a output buffer until the number of cells potentially waiting in that output buffer has dropped below a predetermined threshold. Buffer usage is balanced across the switch by changing the order in which buffers receive misrouted input signals. At the onset of congestion, signals are discarded when necessary at predetermined priority-dependent buffer signal occupancy thresholds. Multicasting can be handled by initially treating a multicast signal as a misrouted signal. The multicast signal is first routed to a merged buffer which did not receive a correctly routed signal, then it is rerouted simultaneously to all of the merged buffers corresponding to its output port destinations, so that all signals can be then sent to the appropriate output ports during a subsequent time period.

48 Claims, 9 Drawing Sheets

U.S. PATENT DOCUMENTS

| | | | |
|---|---|---|---|
| 5,513,134 | 4/1996 | Cooperman et al. | 365/49 |
| 5,517,495 | 5/1996 | Lund et al. | 370/399 |
| 5,519,698 | 5/1996 | Lyles et al. | 370/411 |
| 5,546,391 | 8/1996 | Hochschild et al. | 370/413 |
| 5,574,875 | 11/1996 | Stansfield et al. | 711/3 |
| 5,577,035 | 11/1996 | Haylor et al. | 370/417 |
| 5,583,861 | 12/1996 | Holden | 370/395 |
| 5,590,123 | 12/1996 | Lyles et al. | 370/397 |
| 5,612,951 | 3/1997 | Yu et al. | 370/417 |
| 5,636,210 | 6/1997 | Agrawal | 370/390 |

| BUF | BUF Address | OUT | SQN | MRN | PRIORITY | |
|---|---|---|---|---|---|---|
| 2 | 00000 | 1 | 2 | 1 | 3 | Cell 3 |
| 5 | 00100 | 3 | 4 | 0 | 1 | Cell 8 |
| 2 | 00011 | 2 | 5 | 7 | 3 | Cell 17 |
| | | | | | | Cell N |

Fig. 6

MERGED BUFFER SIGNAL SWITCH

FIELD OF THE INVENTION

The present invention relates to electronic communications systems and, in particular, to high-speed electronic signal switching systems.

BACKGROUND OF THE INVENTION

Prior art signal switch architectures suffer from a number of limitations caused by the physical attributes of the data path and control. For instance, throughput per port generally decreases as the number of ports is increased. In addition, many prior art switches are not capable of handling gigabit per second port rates. Prior art switch architectures generally include variations on output-buffered, input-buffered, and shared memory architectures [T. Takeuchi, H. Suzuki, and T. Aramaki, "Switch Architectures and Technologies for Asynchronous Transfer Mode," *IEICE Transactions* Vol. E 74, No. 4, April 1991; C. Partridge, *Gigabit Networking*, Addison-Wesley Publishing, 1994, Ch. 5, pp. 89–125].

In a prior art output-buffered switch, such as that shown in FIG. 1, N inputs connect to each dedicated output buffer. Each input may send a signal to the switch in each time slot. The buffers are identical, but each is programmed to function as a unique output port and only accepts signals destined for that output [See, e.g. M. J. Karol, M. G. Hluchyj, and S. P. Morgan, "Input Versus Output Queuing on a Space-Division Packet Switch," *IEEE Transactions on Communications*, Vol. 35, No. 12, December 1987, pp. 1347–1356; H. Suzuki, H. Nagano, T. Suzuki, T. Takeuchi, and S. Iwasaki, "Output-Buffer Switch Architecture for Asynchronous Transfer Mode," *International Journal of Digital and Analog Cable Systems* Vol. 2, pp. 269–276, 1989]. It is possible that as many as all N signals coming into the switch during a time slot may be destined for one buffer, requiring that each buffer must be able to accept N signals during any one time slot. Thus, while an output-buffered switch has excellent output characteristics because the output is read only once per time slot, it still encounters speed limitations because the number of write operations to the queue must equal the number of inputs.

In a prior aml input-buffered switch, such as that shown in FIG. 2, each of the N inputs is connected to a dedicated buffer. Signals are subsequently routed to the correct destination by passing through a circuit switch matrix [See, e.g. M. J. Karol, et. al., Supra; N. Arakawa, A. Noiri, and H. Inoue, "ATM switch for Multi-Media Switching System," *International Switching Symposium* (ISS) '90, Vol. A 7 No. 2, May 1990]. Since only one signal can be written to a particular output port at a time, other signals destined for that output must remain in the buffers until the output is not busy. Only the first signal in a buffer can be read, so if it must wait for an output that is not busy, no other signals can leave the buffer. This is known as head-of-line (HOL) blocking. Therefore, it is possible that the buffer may need to be read N times per time slot in order to supply 100% flow to N outputs. Thus, while an input-buffered switch has excellent input characteristics, it still encounters speed limitations because the number of read operations per time slot must equal the number of outputs for 100% throughput.

A prior art shared memory switch, such as that shown in FIG. 3, uses a common memory to store cells from all N inputs. This is an efficient utilization of memory since active inputs can use the memory space of inactive inputs [See, e.g. H. Kuwahara, N. Endo, M. Ogino, T. Kozaki, Y. Sakurai, and S. Gohara, "A Shared Buffer Memory Switch for an ATM Exchange," ICC '89, pp. 118–122, June 1989]. However, one of the limitations of this architecture is illustrated by events when N signals arrive in one time slot. This requires N separate writes to the memory, producing the same speed limitation as seen in an output-buffered architecture, since, again, per port speed is necessarily divided by N. Similarly, the shared memory must be read N times in order to supply signals to outputs in one time slot, producing the same speed limitation found in an input-buffered architecture. Thus, while a shared memory switch provides excellent queue efficiency, it has both the input speed limitations of the output-buffered switch and the output speed limitations of the input-buffered switch.

The prior art "Sunshine" switch, shown in FIG. 4, is essentially an output-buffered Batcher-Banyan network. A Batcher-Banyan network in general is a self-routing switch which performs the same routing functions as an externally controlled x-y space switch [See, e.g. T. T. Lee, "Nonblocking Copy Networks for Multicast Packet Switching," *IEEE Journal on Selected Areas in Communications*, Vol.9, No. 9. 12-1988, pp. 1455–1467; H. Uematsu and R. Watanabe, "Architecture of a Packet Switch Based on Banyan Switching Network with Feedback Loops," *IEEE Journal on SelectedAreas in Communications*, Vol.9, No. 9. 12-1988, pp. 1521–1527]. It has the advantage of port expandability over an x-y space switch because the hardware required by an N-port Batcher-Banyan switch is roughly proportional to $Nlog_2N$ rather than $N^2$ for an N-port x-y space switch. On the other hand, the Batcher-Banyan has limited broadcasting capability and lower connectivity than the x-y space switch. The Batcher-Banyan network is often used to steer signals into a set of buffers, resulting in an essentially output-buffered architecture.

Several switch architectures have been developed utilizing a Batcher-Banyan network and signal feedback, including the "STARLITE" and "Sunshine" switches. The "STARLITE" switch is based on an input-buffered architecture [A. Huang and S. Knauer, "STARLITE: A Wideband Digital Switch" *Proc. IEEE Communications Society GLOBECOM*84 (Atlanta, Ga.), 26–29 Nov. 1984, pp.121–125], while the "Sunshine" switch shown in FIG. 4 is, except for the input-buffered recirculator queues, basically output-buffered [J. N. Giacopelli, J. J. Hickey, W. S. Marcus, W. D. Sincoskie, and M. Littlewood, "Sunshine: A High Performance Self-Routing Broadband Packet Switch Architecture," *IEEE Journal on Selected Areas in Communications*, Vol. 9, No. 8, October 1991, pp. 1289–1298]. The most significant difference between these two approaches and the present invention is that they recirculate contending signals back through the circuit switch sorting network again during the very next switch cycle, regardless of whether the intended outputs have become not busy. This recirculation occurs solely within the circuit switch matrix and can occur repeatedly to a particular signal, leading to excessive latency that could cause loss of signal sequence integrity.

The present invention solves these problems by using a single merged buffer that is outside the circuit switch fabric to temporarily store both correctly and incorrectly routed cells. The cells are not repeatedly recirculated through the circuit switch matrix, but are instead misrouted for temporary storage and then sent immediately to the correct destination when the output port is no longer busy.

OBJECTS OF THE INVENTION

Accordingly, a primary object of the present invention is to improve on the performance of prior art signal switches with respect to the processing of multi-priority, multimedia traffic of widely varying types, and to meet this object through an architecturally innovative signal switch which utilizes the best aspects of prior art switches while avoiding their individual limitations.

In particular, an object of the present invention is, by avoiding the limitations imposed on prior art switch architectures by the data path and control, to allow increased numbers of ports without a corresponding loss of throughput per port. This is preferably accomplished while still retaining the signal loss characteristics of a shared memory architecture, specifically that signal losses be distributed across ports and that the total signal loss be the lowest of any existing architecture.

A further object of this invention is to allow switch operation at gigabit/second port rates without the use of specialized high-speed technology.

SUMMARY

In a first aspect of the present invention, a signal switch utilizes a merged buffer architecture to provide advantages such as port expandability and capacity for gigabit signal input rates. The merged buffer switch has multiple input ports connected to a circuit switch matrix that, in a preferred embodiment, has no internal blocking. The circuit switch matrix partially sorts the input signals based on output port destination and is connected to multiple merged buffers, each of which is in turn connected to a corresponding output port and feedback. Input signals entering the circuit switch matrix are sent to the buffer that corresponds to the output port destination of the input signal. If more than one input signal is contending for an output port, the circuit switch matrix misroutes all but the first contending input signal to a merged buffer that is not busy.

In one embodiment, the location in memory of all of the correctly routed and misrouted input signals in the switch is tracked by a control that is connected to both the circuit switch matrix and the merged buffers. When the circuit switch matrix misroutes a contending input signal, it sets a tag which indicates to the control that the signal has been misrouted. The control will subsequently reset this tag when the signal has been rerouted to the intended output port. The control is responsible for routing the next correctly routed input signal to its output port destination from the buffer, as well as for rerouting the next misrouted input signal to the correct merged buffer. The control does not reroute a misrouted signal until the second half of a time slot when the intended buffer is not busy, thus ensuring that each input signal will be rerouted at most once. In addition, in some embodiments the control tracks the priority, sequence number, and output port destination of each input signal. Tracking the priority of each input signal allows the control to give preference to the higher priority input signals going to a particular output port and to alleviate buffer overflow by selectively discarding lower priority input signals first.

In another embodiment, the merged buffer switch utilizes a clock with a speed up factor of 2 so that two buffer writes can be performed per time slot. The input signals are written to the merged buffers during the first half of a time slot. Misrouted input signals are rerouted and written to the buffers during the second half of the time slot. The correctly routed input signals are then written to the output ports during the first half of the following time slot. The control is read once per each output port during each half of a time slot.

Potential buffer overflow, caused by the fact that the buffer input rate is twice that of the buffer output rate, is minimized in one embodiment of the invention by using back pressure control. The sequence number of the input signal leaving the buffer during the first half of a time slot is compared to the sequence number of the rerouted input signal entering during the second half of the time slot. The difference between the sequence numbers is equal to the number of input signals potentially waiting in the output buffer to go to the output port and is compared to a threshold. Rerouted input signals are denied access to the output buffer until the number of signals potentially waiting in the buffer has dropped below the threshold.

Buffer usage is balanced across the switch in one embodiment of the invention through buffer sharing. The utilization of the merged buffers is tracked by the circuit switch matrix, and at the beginning of each time slot the order in which the buffers which are not busy receive misrouted input signals is changed by moving the starting position. This mechanism ensures fairness in the utilization of the buffers and helps to avoid buffer overflow and blocking problems. It also helps to avoid signal discarding as long as possible and, when it does occur, to allow signal losses to be distributed across the ports.

In another embodiment, the merged buffer architecture utilizes a partial buffer sharing signal discard algorithm to implement signal discarding at the onset of congestion. Signals are discarded at predetermined buffer signal occupancy thresholds before they can enter the full buffers. The thresholds are priority-dependent, with lower priority cells being discarded at lower buffer occupancy levels. By utilizing this scheme, the merged buffer switch has a low signal loss characteristic that is less than that of either an output-buffered or an input-buffered architecture.

The merged buffer switch handles multicasting in one aspect of a preferred embodiment by initially treating a multicast signal as a misrouted signal. During the first half of the first time slot, the multicast signal is placed in any buffer that did not received a correctly routed signal and is marked as misrouted. During the second half of the time slot, the multicast signal is rerouted to all of the merged buffers corresponding to its output port destinations. The control simultaneously reroutes regular misrouted signals to the remaining merged buffers. All signals are then sent to the output ports during some subsequent first half of a time slot. Because servicing multicast signals takes up a large amount of switch resources, in a preferred embodiment they would be serviced at most every other time slot. In an alternative embodiment, this problem is solved by clocking with a speed up factor of at least 4.

BRIEF DESCRIPTION OF THE DRAWINGS

FIG. 6 shows the contents of a content-addressable memory utilized as a control according to one embodiment of the present invention;

DETAILED DESCRIPTION OF THE PREFERRED EMBODIMENT

Figure 1:
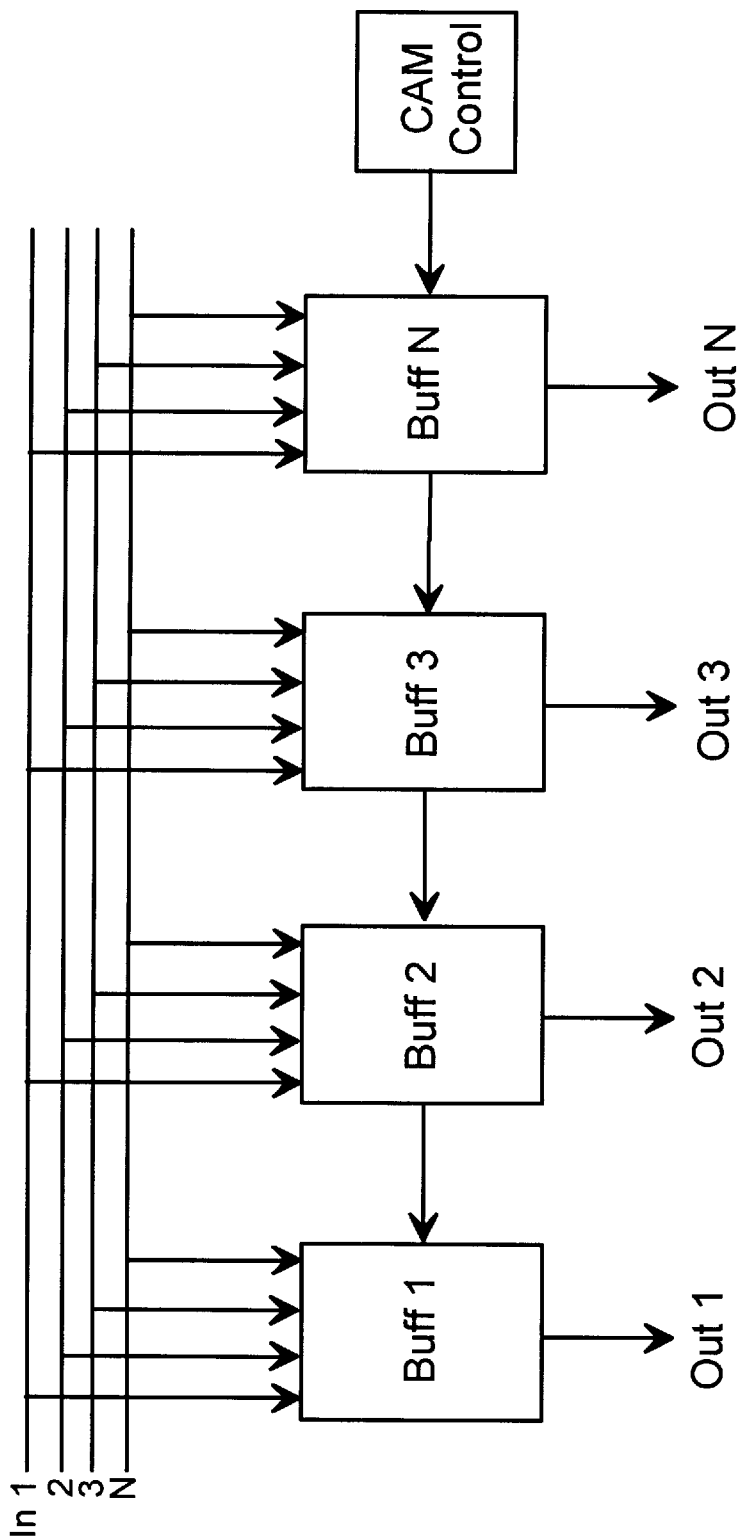
FIG. 1 is a block diagram of a prior art output-buffered switch.
Figure 2:
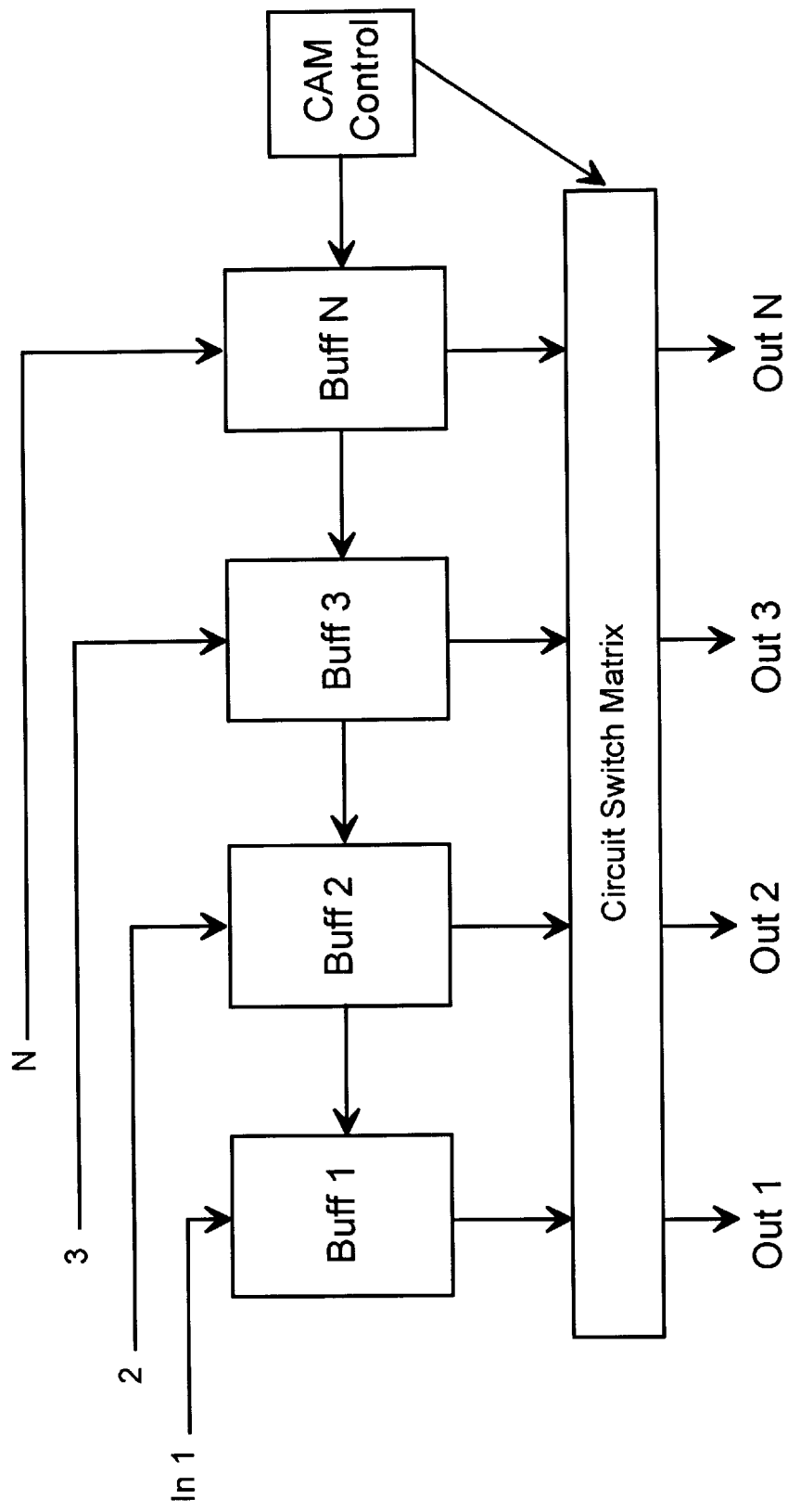
FIG. 2 is a block diagram of a prior art input-buffered switch.
Figure 3:
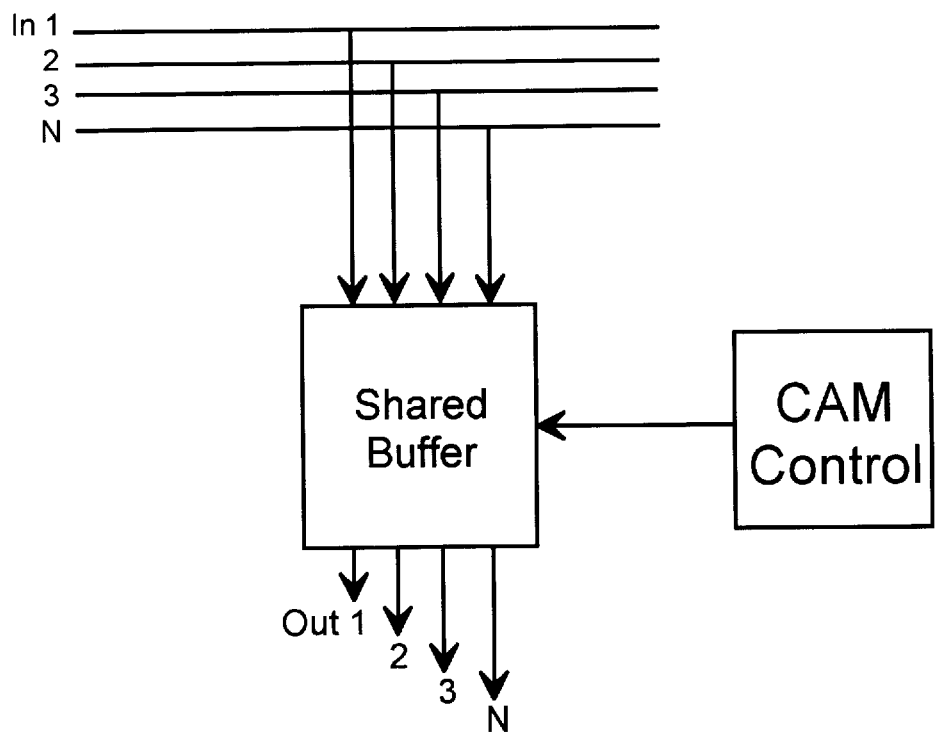
FIG. 3 is a block diagram of a prior art shared memory switch.
Figure 4:
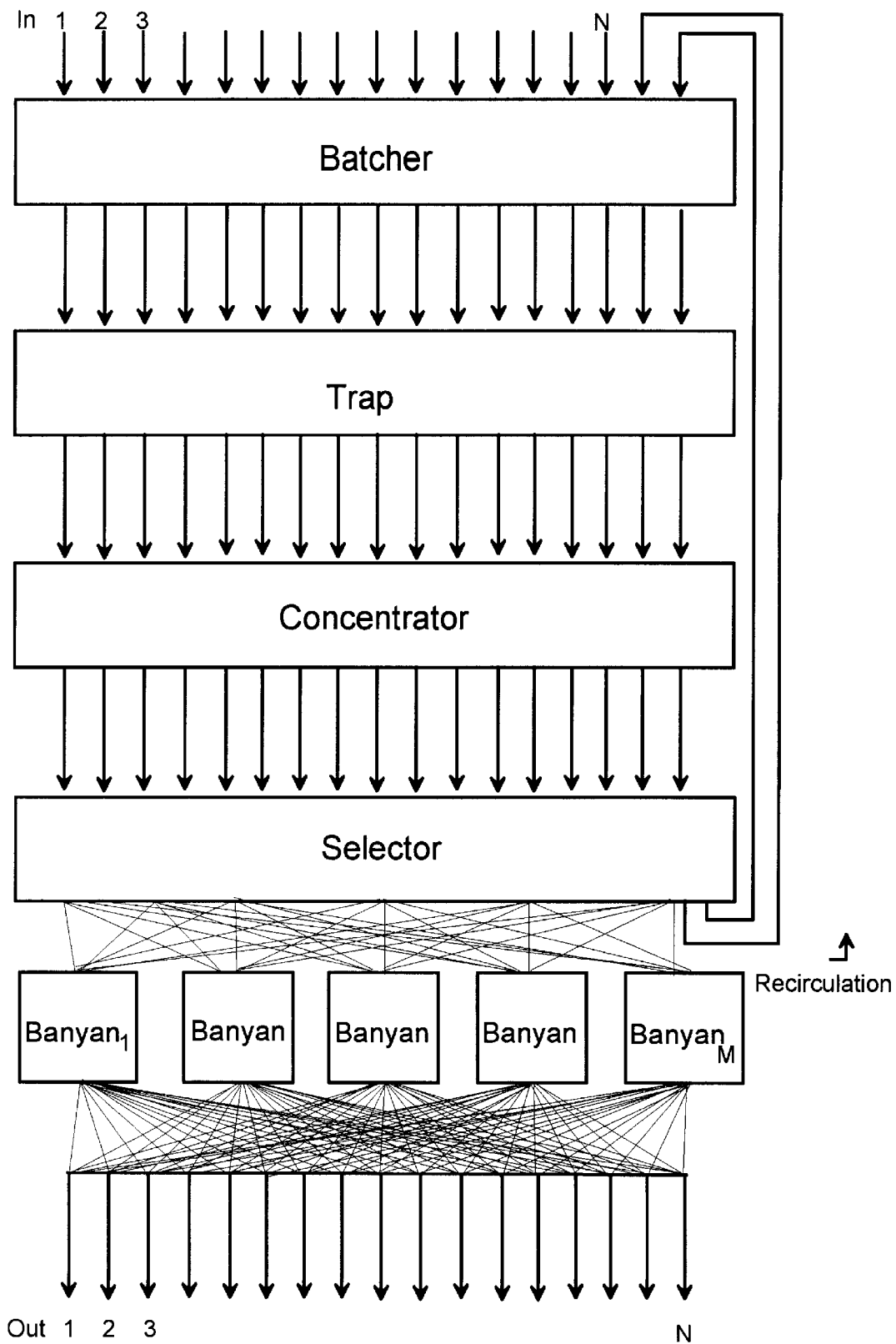
FIG. 4 is a block diagram of the prior art Batcher-Banyan "Sunshine" switch.
Figure 5:
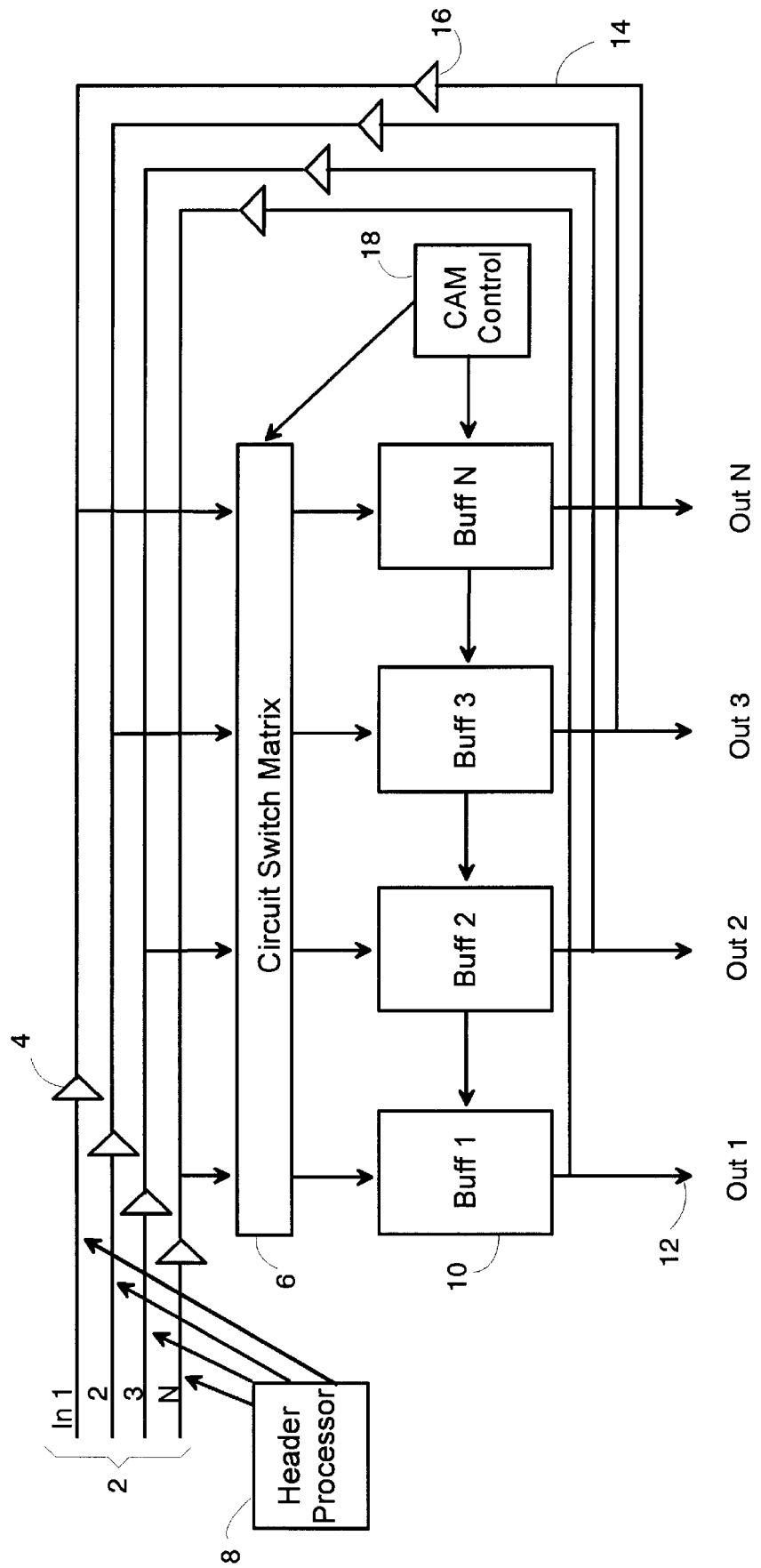
FIG. 5 is a block diagram of a merged buffer switch in accordance with one embodiment of the present invention.

In a preferred embodiment, a merged buffer switching mechanism, shown in FIG. 5, has N input ports 2, each connected through a corresponding input tristate 4 to a circuit switch matrix fabric 6. Although any type of circuit matrix will work, in the preferred embodiment the circuit switch matrix 6 has no internal blocking, such as, for example, a Batcher-Banyan network. A function of the circuit switch matrix 6 is to partially sort the input signals based on output port destination address. In a preferred embodiment, a header processor 8 is connected to the input ports 2 and creates an internal routing header for each signal entering at the input ports 2. The internal routing header contents include the priority of the input signal, the output port destination address of the input signal, and a sequence number that is assigned to the input signal by the header processor 8 based on the priority and output port destination address.

The circuit switch matrix 6 is connected to N merged buffers 10. Each merged buffer 10 has M memory locations and is in turn connected to an output data pathway to a corresponding output port 12 and a corresponding feedback 14. In the preferred embodiment each feedback 14 is connected through a corresponding feedback tristate 16 to a point between a corresponding input tristate 4 and the circuit switch matrix 6. The connections between the input ports 2 and the circuit switch matrix 6 can be point-to-point. Input signals entering the circuit switch matrix 6 are sent, if possible, to the merged buffer 10 attached to the output port 12 that corresponds to the output port destination address of the input signal. If more than one input signal is contending for a merged buffer 10, the circuit switch matrix 6 misroutes all but the first contending input signal to a merged buffer 10 that is not busy.

In a preferred embodiment, the locations of both correctly routed and misrouted input signals are tracked by the content-addressable memory (CAM) control 18, which has N×M memory locations as well as control logic and is connected to both the circuit switch matrix 6 and the merged buffers 10. In one embodiment, the CAM control 18 includes a FIFO to track and allocate free memory locations in the merged buffer 10 and in the CAM control 18 itself. When the circuit switch matrix 6 misroutes a contending input signal, it sets a sequentially increasing tag, called a misrouted number, which is stored in the CAM control 18 to indicate that the input signal is misrouted. The CAM control 18 uses this tag to identify that the input signal has been misrouted, and then resets it when the signal is subsequently rerouted to the intended output port 12.

In this embodiment, the CAM control 18 also obtains the priority, sequence number, and output port destination of each input signal from the internal routing header and stores them in memory along with the misrouted number and the address in the merged buffer 10 of the input signal. The CAM control 18 utilizes the sequence number to identify the next correctly routed input signal to send to its output port destination 12. It similarly utilizes the misrouted number to identify the next misrouted input signal to be rerouted to the correct merged buffer 10.

The CAM control 18 reroutes the misrouted input signals along the feedbacks 14 to the circuit switch matrix 6. The misrouted input signals rejoin the input lines as the same type of datastream as the received input signals; if necessary, parallel-to-serial conversion is performed on the misrouted input signals as they leave the merged buffers 10. In one embodiment, the input tristates 4 and feedback tristates 16 allow the input ports 2 and the feedbacks 14 to be alternately connected and disconnected as needed to allow either newly arrived input signals or rerouted input signals to be sent to the circuit switch matrix 6. The circuit switch matrix fabric 6 is capable of accepting the rerouted input signals. The CAM control 18 does not reroute a misrouted signal until its intended merged buffer 10 is not busy, thus ensuring that each input signal will be rerouted at most once.

In a preferred embodiment, the content-addressable memory contents, illustrated in FIG. 6, uniquely identify and keep track of every input signal presently in the switch. The buffer number 20, and the address within that buffer 22, allow location of the place in memory where the actual signal contents are stored. For example, for an asynchronous transfer mode cell, this would be the storage location of the 48-byte data packet and five-byte header. The output port destination 24, in combination with the sequence number 26, allows the CAM control 18 to search for the next input signal intended for a particular output port 12. Similarly, the misrouted number 28, in combination with the output port destination 24, allows the CAM control 18 to search for the next misrouted input signal to reroute to the correct merged buffer 10. The priority 30 allows the CAM control 18 to give preference to the higher priority input signals going to a particular output port 12 and to alleviate buffer overflow by selectively discarding the lower priority input signals from a full or nearly full buffer first.

The minimum number of available sequence numbers 26 will, in a preferred embodiment, be at least equal to the number of merged buffers 10 (N) times the number of memory locations (M) per buffer. In a preferred embodiment there will also be a maximum sequence number, with the assignment of sequence numbers wrapping around to begin again at the first sequence number after the maximum sequence number has been assigned. The same is true for the misrouted numbers 28; in the preferred embodiment the minimum misrouted number will be equal to N×M and there will be a maximum number after which the misrouted numbers will be reused in the previous order.

In the preferred embodiment, the merged buffer switch utilizes a clock with a speed up factor of at least 2 so that two buffer reads and two buffer writes can be performed per time slot. The input signals are written to the merged buffers 10 during the first half of a time slot (TSA). Misrouted input signals are rerouted and written to the merged buffers 10 during the second half of the time slot (TSB). The now correctly routed input signals are then written to the output ports 12 during the first half of the following time slot. The CAM control 18 is read once per each output port 12 during each half of a time slot.

In the merged buffer switch, the merged buffers 10 act as logical output buffers for correctly routed signals and as logical input buffers for misrouted signals. Because a misrouted signal waits in a logical input buffer until the CAM control 18 determines that it should be next to be routed to the correct merged buffer 10, each signal is rerouted at most once. The second time through the circuit switch fabric 6, a signal will always reach its correct destination buffer. This is a major advantage over prior art architectures such as the "Sunshine" switch in which a signal may recirculate many times before finally going to the correct destination, a practice which is an inefficient utilization of the switch memory and hardware resources, as well as a potential source of loss of signal sequence integrity.

Because a merged buffer 10 can only be read once per half time slot, the CAM control 18 aborts the rerouting of a misrouted input signal if it is in a merged buffer 10 from which another misrouted input signal has already been taken during the current half time slot. This occurs only rarely, because on average 65% of the input signals will be correctly routed directly upon entry to the merged buffer switch. The remaining 35% of the input signals will be misrouted and therefore subject to being essentially input-buffered within the merged buffers 10. When the merged buffers 10 act as input buffers, they have a throughput equal to 59% of the potential switch input signal load, far greater than the anticipated 35% of input signals that will be misrouted by the merged buffer switch. Because of this, abort of rerouting by the CAM control 18 will very seldom occur.

The fact that only two buffer reads and two buffer writes are required per time slot results in several of the major advantages of the merged buffer architecture. Where s is the total queue speed, port speed for the merged buffer switch is a constant s/2. This is in contrast to the port speed seen in the prior art architectures, s/N, which is dependent on the number of input or output ports or both. This means that the merged buffer switch can operate at very high port speeds, even gigabit per second, and that the number of ports can be increased without any loss of port speed.

Figure 7:
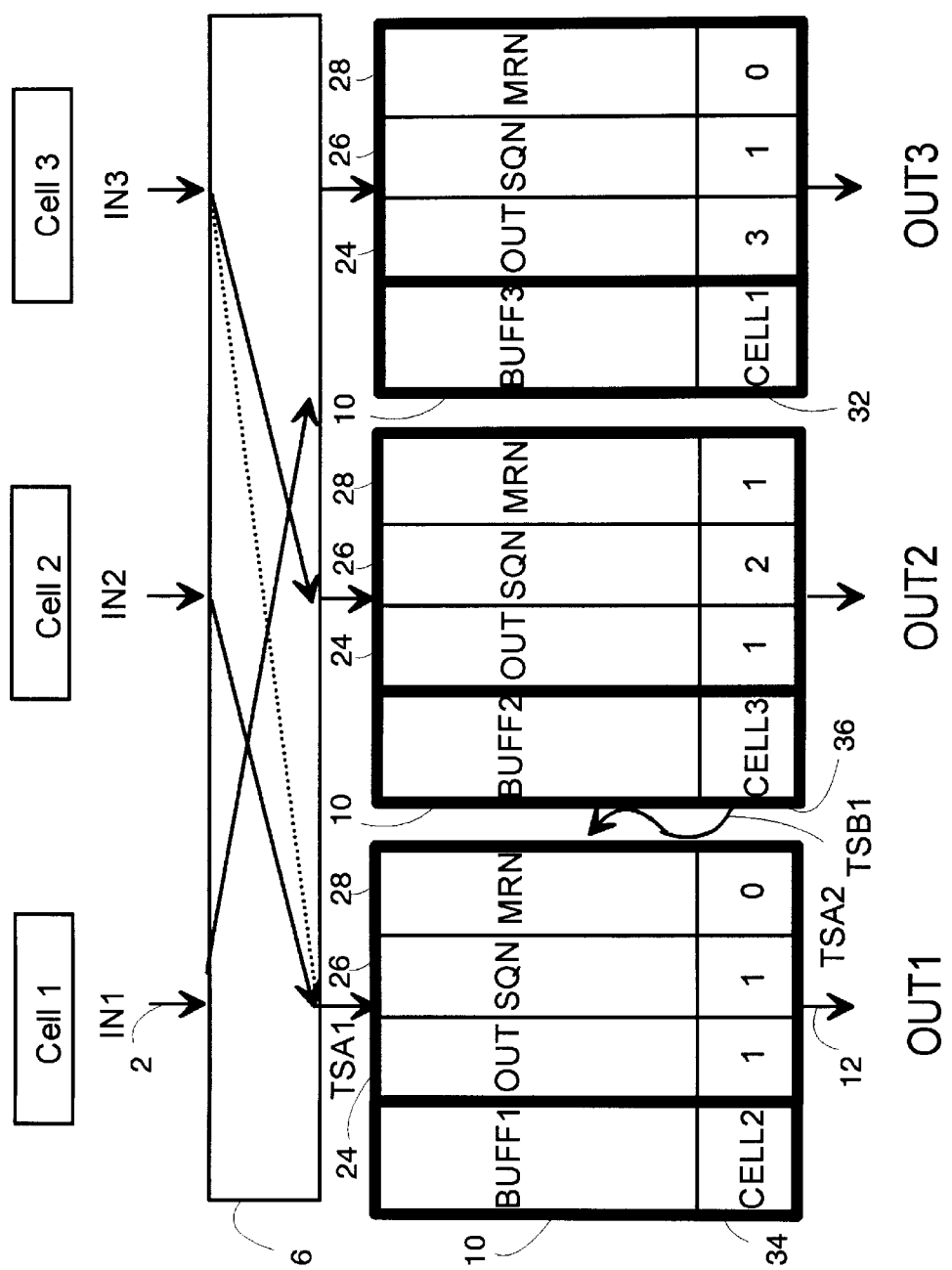
FIG. 7 is an illustration of the operation of a merged buffer switch constructed according to one embodiment of the present invention.

The operation of the merged buffer switch is illustrated FIG. 7 for a 3-input/3-output system. In a preferred embodiment, the input signals will be data packets, and in the described embodiment they are asynchronous transfer mode (ATM) cells. After entering the input ports 2, the cells are partially sorted as they pass through the circuit switch matrix 6. The contents 32 of cell1 show that it has an output port destination 24 of 3 and a sequence number 26 of 1. No other cell entering the switch is destined for output port 3, so during the first half of the time slot (TSA1) cell1 is written directly to BUFF3 and its misrouted number 28 remains 0. The contents 34 of cell2 show that it has an output port destination 24 of 1. Since it is the first cell contending for output port 1, it is written directly to BUFF1 and its misrouted number 28 also remains 0. The contents 36 of cell3 show that its output port destination 24 is also 1. It is therefore the second cell contending for output port 1. As a result, it is misrouted to a merged buffer 10 that is not busy, BUFF2, and it is assigned a misrouted number 24 of 1, since it is the first cell for output port 1 to be misrouted.

During the second half of the time slot (TSB1), cell3 is rerouted from BUFF2, through the circuit switch matrix 6, to BUFF1, the buffer 10 corresponding to cell3's output port destination 24. Cell1 and cell2 are then written from the merged buffers 10 to the output ports 12 during the first half of the following time slot (TSA2). Cell3 has to wait through that entire time slot in BUFF1 before being sent to output port 1 during the first half of the next time slot (TSA3) because there is only a single write from the merged buffers to output during a time slot. Were cell3 of a higher priority than cell2, the CAM control 18 would write it to output port 1 first, in preference over cell2, with the CAM control 18 guaranteeing that the cell sequence integrity is not corrupted.

As is true with prior art switches, the possibility of buffer overflow must be considered. While buffer overflow could potentially occur in the merged buffer architecture, the preferred embodiment of the merged buffer switch minimizes the problem through several methods. Buffer overflow is possible because each buffer may receive both a correctly routed input signal during the first half of a time slot and a rerouted input signal during the second half of a time slot. Since signals are only written to the output ports once during a time slot, the buffer input rate is twice that of the buffer output rate. Buffer overflow is minimized and the efficiency of switch operation improved in one embodiment by use of back pressure control. Use of back pressure control also allows the switch to minimize the possibility that a specific input signal is not available in the buffer for its intended output when it is called for. In addition, back pressure control allows the most efficient use of the switch resources by not sending input signals to a place where they are not currently needed, thus freeing the switch to do something else during a particular time slot, and helps to keep the load of stored misrouted cells distributed across the buffers.

In an embodiment utilizing back pressure control, the sequence number of the input signal leaving the buffer during the first half of the time slot (TSA) is compared to the sequence number of the rerouted input signal entering during the second half of the time slot (TSB). The difference between the sequence numbers is the number of input signals potentially waiting in the logical output buffer to go to the output port. This difference is then compared to a threshold, the back pressure control parameter. Rerouted input signals are denied access to the logical output buffer until the number of cells waiting has dropped below the threshold. Simulation has shown that the back pressure control parameter should generally be set between 5 and 30, with 20 being about optimum. Too small a value for the back pressure parameter is not desirable, because if the supply of input signals in a buffer is too small then the next signal in sequence to be output may have been misrouted and not yet rerouted to the correct buffer in time to be sent to the output port.

Figure 8:
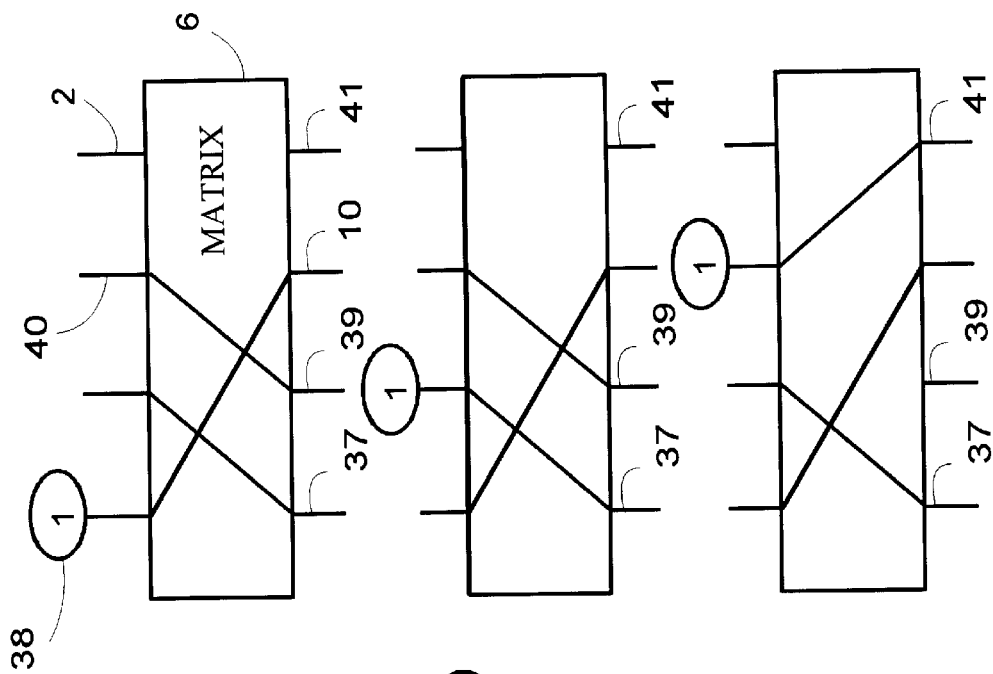
FIG. 8 is an illustration of the method of buffer sharing utilized in one embodiment of the present invention.
Figure 8:
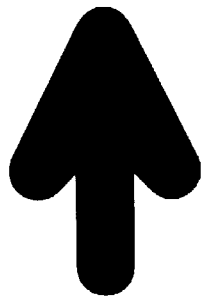
Figure 8:
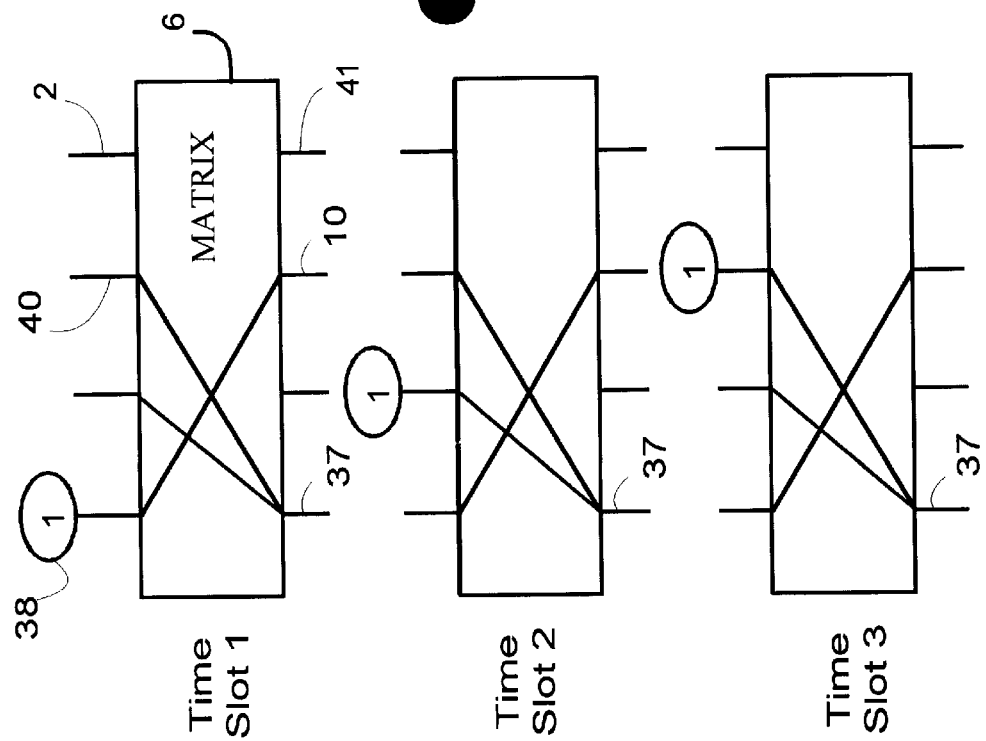

Buffer usage can be balanced across the switch through buffer sharing, illustrated in FIG. 8, a way of dynamically reconfiguring the switch fabric. The utilization of the merged buffers 10 is tracked by the circuit switch matrix 6, and, at the beginning of each time slot, the order in which the merged buffers 10 that are not busy receive misrouted input signals is changed by moving the starting position 38 one position in, for example, a "clockwise" direction. A second contending input signal 40 for BUFF1 37 would therefore be misrouted to a different not busy merged buffer 10 depending on the time slot. While it would be misrouted to BUFF2 39 in both Time Slot 1 and Time Slot 2, because of buffer sharing contending input signal 40 would instead be misrouted to BUFF4 41 in Time Slot 3. This mechanism ensures fairness in the utilization of the buffers and helps to minimize buffer overflow and blocking problems. It also allows any signal losses to be avoided as long as possible and, when they occur, they are distributed across the ports. This is one of the desirable features of a shared memory architecture that is also found in the merged buffer architecture.

In one embodiment, the merged buffer architecture utilizes a partial buffer sharing signal discard algorithm to implement signal discarding at the onset of congestion. Signals are discarded at predetermined buffer signal occupancy thresholds before they can enter the fill buffers. The thresholds are priority-dependent, with lower priority signals being discarded at lower buffer occupancy levels. For, example, for one four-priority scheme, lowest priority signals begin to be discarded when the buffer occupancy level is 85%. Signals with the next higher priority will start to be discarded when the buffer signal occupancy level climbs to 90%. Signals in the second highest priority are discarded beginning at a 95% buffer signal occupancy level. Highest priority signals are not discarded until the buffer is completely (100%) full. This scheme ensures that a high percentage of highest priority signals will get routed correctly. When utilizing this scheme, the merged buffer switch has a signal loss characteristic that is less than that of either an input-buffered or an output-buffered architecture.

Figure 9:
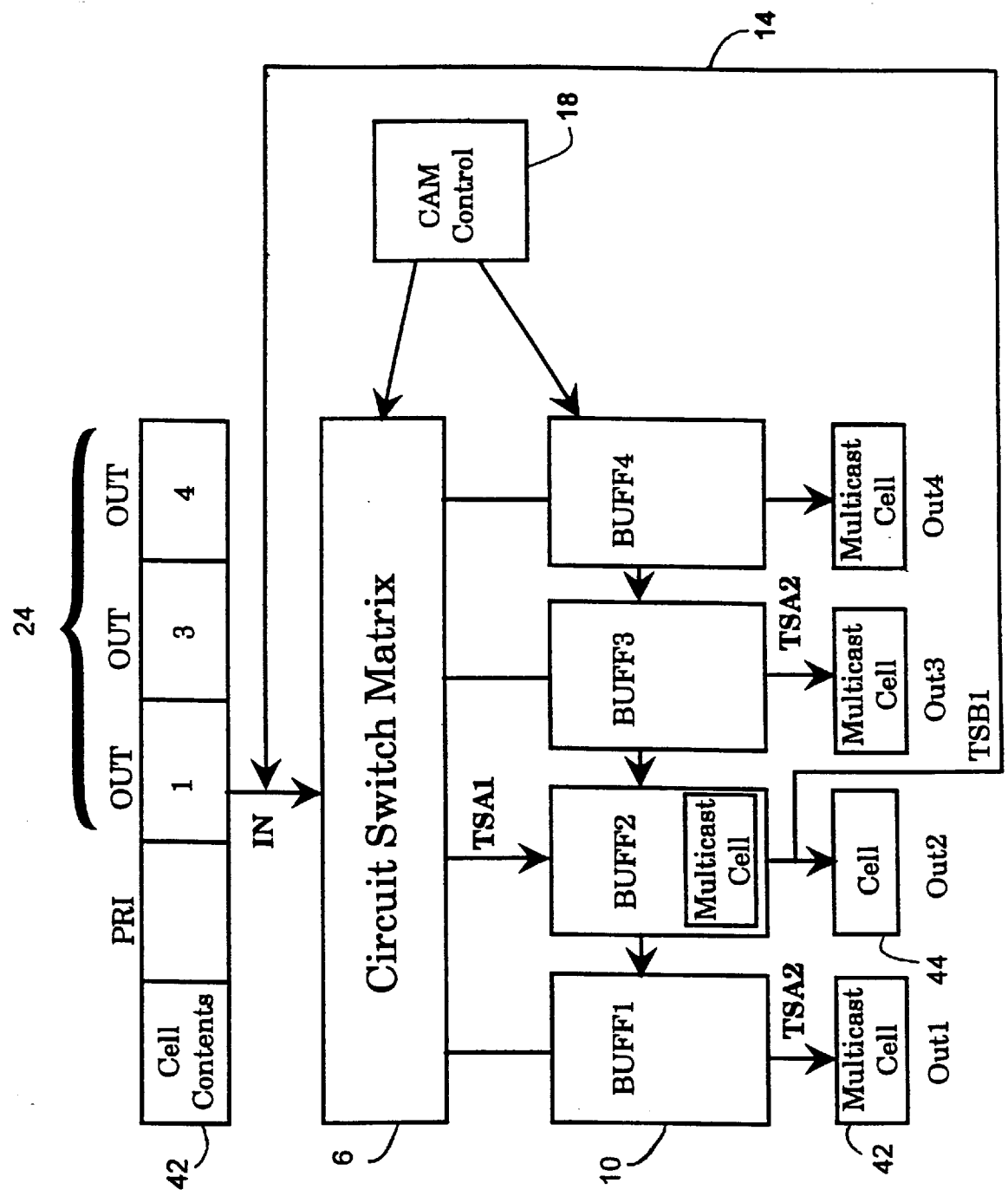
FIG. 9 is an illustration of a method for multicasting using one embodiment of the present invention.

Although there are a number of different approaches to multicasting that can be utilized by the merged buffer switch, in a preferred embodiment the merged buffer switch handles multicasting, as illustrated in FIG. 9 for ATM cells, by initially treating a multicast cell 42 as a misrouted cell. During the first half of the first time slot (TSA), the multicast cell 42 is assigned a misrouted number and is placed in any merged buffer 10 that did not received a correctly routed cell. During the second half of the time slot (TSB) the multicast cell 42 is then rerouted to all of the merged buffers 10 corresponding to its output port destinations. The CAM control 18 simultaneously reroutes regular misrouted cells 44 to the remaining merged buffers 10. All cells are then sent to the output ports during some subsequent first half of a time slot.

Because servicing multicast signals takes up a large amount of switch resources, in the preferred embodiment they would be serviced at most every other time slot. An alternative solution would be to clock with a speed up factor of at least 4, although this will lead to a reduction in port speed. Which is preferred is dependent on variables such as the number of ports and the amount of time necessary for reads and writes to the CAM control 18.

Modifications and substitutions by one of ordinary skill in the art are considered to be within the scope of the present invention, which is not to be limited except by the claims which follow.

What is claimed is:

1. A switch for receiving a plurality of data packets as input signals through a plurality of input ports and for providing said data packets as output signals through a selected plurality of output ports, wherein each of said data packets has a corresponding output port destination, said switch comprising, in combination:

header processing means connected to said plurality of input ports for assigning a sequence number to each of said data packets;

a plurality of merged buffers, each comprising a plurality of memory locations, for receiving and temporarily storing said plurality of data packets, wherein each of said merged buffers is connected to a corresponding one of said output ports;

a circuit switch matrix connected between said plurality of input ports and said plurality of merged buffers for relaying said plurality of data packets to said merged buffers, comprising, in combination:

means for partially sorting said plurality of data packets according to said output port destination;

means for routing each of said data packets to the one of said merged buffers which is connected to the one of said output ports which corresponds to said output port destination of said data packet if said merged buffer is not busy;

means for resolving contention among said plurality of data packets for any of said output ports by misrouting all but the first contending one of said data packets to one of said merged buffers that is not busy;

means for assigning a misrouted number to each of said misrouted data packets; and means for accepting rerouted ones of said data packets;

a plurality of feedbacks between said plurality of merged buffers and said circuit switch matrix for rerouting from said merged buffers those of said data packets which have been misrouted, wherein each of said feedbacks is connected to a corresponding one of said merged buffers; and content-addressable memory means connected to said circuit switch matrix and said plurality of merged buffers for routing said plurality of data packets between said circuit switch matrix, said merged buffers, and said output ports, comprising, in combination:

means for tracking and storing the location within said plurality of merged buffers of each of said data packets;

means for identifying which of said data packets located in said merged buffers have been misrouted;

means for indicating when each of said misrouted ones of said data packets has subsequently been rerouted;

means for identifying by utilizing said sequence number the next one of said data packets to be sent to each of said output port destinations;

means for identifying by utilizing said misrouted number the next one of said misrouted data packets to be rerouted;

means for rerouting to said circuit switch matrix said misrouted ones of said data packets according to said misrouted number and said output port destination; and means for routing each of said plurality of data packets according to said sequence number and said output port destination from said plurality of merged buffers to said plurality of output ports.

2. The switch of claim 1, wherein:

said header processing means further comprises means for creating an internal routing header for each of said data packets, comprising, in combination:

means for identifying and storing in said internal routing header a priority for said data packet;

means for identifying and storing in said internal routing header the output port destination for said data packet; and means for storing in said internal routing header said sequence number for said data packet; and said circuit switch matrix further comprises means for relaying said plurality of data packets to said merged buffers according to said internal routing header.

3. The switch of claim 2, wherein said content-addressable memory means further comprises means for identifying and storing said priority of each of said data packets and means for routing each of said data packets according to said priority from said plurality of merged buffers to said plurality of output ports.

4. The switch of claim 3, further comprising, in combination:

clocking means with a speedup factor of at least 2; and means for reading and writing to and from said plurality of input ports, said circuit switch matrix, said plurality of merged buffers, said content-addressable memory means, and said plurality of output ports, such that said data packets are written to said merged buffers during the first part of a time slot, said misrouted ones of said data packets are rerouted during the second part of a time slot, and the correctly routed ones of said data packets are written to said output ports during the first part of a subsequent time slot.

5. The switch of claim 4, further comprising, in combination:
an input tristate connected between each of said input ports and said circuit switch matrix; and
a feedback tristate connected between each of said feedbacks and a point between a corresponding one of said input tristates and said circuit switch matrix.

6. The switch of claim 5 wherein:
said sequence numbers increase sequentially per said priority and said output port destination to a preset maximum sequence number, said sequence numbers subsequently starting over with the first of said sequence numbers; and
said misrouted numbers increase sequentially per said output port destination to a preset maximum misrouted number, said misrouted number subsequently starting over with the first of said misrouted numbers.

7. The switch of claim 6, further comprising means for aborting said rerouting of any of said misrouted data packets if said misrouted data packet is in one of said merged buffers from which a misrouted one of said data packets has already been read during the same time period.

8. The switch of claim 7, wherein said data packets are asynchronous transfer mode cells.

9. The switch of claim 7, wherein said content-addressable memory includes a FIFO.

10. The switch of claim 7, wherein said circuit switch matrix further comprises means for tracking the utilization of said not busy ones of said merged buffers and means for changing the order in which said not busy ones of said merged buffers receive said misrouted data packets.

11. The switch of claim 7, wherein said content-addressable memory means further includes means for minimizing overflow of said merged buffers by comparing said sequence number of said rerouted data packet entering one of said merged buffers during the second half of a time slot to said sequence number of said correctly routed data packet leaving said merged buffer during the subsequent first half of a time slot and by not admitting additional ones of said rerouted data packets to said merged buffer until the absolute difference between said sequence numbers is less than a preset back pressure parameter.

12. The switch of claim 7, wherein the contents of each of said plurality of memory locations of said content-addressable memory means includes:
said sequence number of one of said input signals;
said corresponding output port destination of said input signal;
said corresponding priority of said input signal;
said misrouted sequence number;
the address of the one of said merged buffers containing said input signal; and
the address within said merged buffer means of said input signal.

13. The switch of claim 7, further including means for multicasting.

14. The switch of claim 13, wherein said means for multicasting comprises, in combination:
means for assigning one of said misrouted numbers to a multicast data packet, said malticast data packet being one of said data packets having more than one of said output port destination;
means for routing said multicast data packet to one of said merged buffers that did not receive a correctly routed one of said data packets;

means for rerouting said multicast data packet to multiple ones of said merged buffers during the second half of a time slot, said multiple ones of said merged buffers corresponding to said more than one output port destinations;
means for identifying not busy ones of said merged buffers after one of said multicast data packets has been rerouted to said merged buffers corresponding to said output port destinations; and
means for rerouting additional ones of said misrouted data packets to said not busy merged buffers during the same second half of a time slot.

15. The switch of claim 7, further comprising, in combination:
means for setting a predetermined buffer occupancy threshold for each of said priorities, said predetermined buffer signal occupancy threshold being lowest for the lowest of said priorities and highest for the highest of said priorities; and
means for discarding said data packets according to said priority before said data packets enter one of said merged buffers, said discarding occurring when the number of said data packets in said merged buffers reaches said predetermined buffer occupancy threshold, said discarding occurring in such a manner that said data packets with a lower of said priority are discarded first.

16. A switching mechanism for concurrently routing each given one of a plurality of signals to a selected one of plural output data pathways in accordance with a destination address, said mechanism comprising, in combination:
a plurality of input ports for concurrently receiving said signals;
a plurality of buffers, each capable of storing at least one of said signals and each provided with a signal input and further provided with a signal output connected to a corresponding one of said output data pathways; and
switching means connected between said input ports and said buffers, said switching means comprising, in combination:
means responsive to said destination address of each of said given signals for identifying a destination one of said plurality of buffers connected to the one of said output data pathways specified by said destination address;
means for routing said given signal to said destination buffer for immediate transfer to said destination output data pathway when said destination buffer is not busy; and
means for misrouting and temporarily storing said given signal in a not busy one of said buffers when said destination buffer is busy, and for thereafter rerouting said misrouted and temporarily stored signal to said destination buffer when said destination buffer becomes not busy.

17. The switching mechanism of claim 16, wherein said switching means includes a circuit switch fabric for relaying said plurality of signals to said buffers according to said destination addresses, said circuit switch fabric utilizing a means for at least partially sorting said plurality of signals according to said destination addresses.

18. The switching mechanism of claim 17, wherein said switching means further includes a plurality of feedbacks between said plurality of buffers and said circuit switch fabric for rerouting from said buffers those of said signals which have been misrouted, wherein each of said feedbacks is connected to a corresponding one of said buffers.

19. The switching mechanism of claim 18, wherein said switching means includes control means for routing said plurality of signals between said switching means, said buffers, and said output data pathways, comprising, in combination:

means for tracking and storing the location of each of said signals within said plurality of buffers;

means for identifying which of said signals located in said buffers have been misrouted;

means for indicating when each of said misrouted ones of said signals has been subsequently been rerouted;

means for identifying the next one of said signals to be sent to each of said output data pathways; and means for identifying the next one of said misrouted signals to be rerouted.

20. The switching mechanism of claim 16, further including clocking means with a speedup factor of at least 2.

21. The switching mechanism of claim 17, wherein said switching means has no internal blocking.

22. The switching mechanism of claim 19, wherein said control means is a content-addressable memory comprising a plurality of memory locations and control logic.

23. The switching mechanism of claim 22, wherein said content-addressable memory includes a FIFO.

24. The switching mechanism of claim 22, wherein said signals are data packets.

25. The switching mechanism of claim 19, wherein said switching means further includes means for tracking the utilization of not busy ones of said buffers and means for cycling the order in which said not busy ones of said buffers receive said misrouted signals.

26. The switching mechanism of claim 16, further including means for multicasting.

27. The switching mechanism of claim 25, further including means for multicasting.

28. A method for receiving a plurality of data packets from a plurality of input ports and for providing said data packets as output signals through a selected plurality of output ports, comprising, in combination, the steps of:

assigning a sequence number to each of said data packets;

providing a plurality of merged buffers, each comprising a plurality of memory locations, wherein each of said merged buffers is connected to a corresponding one of said output ports, for receiving, and temporarily storing said plurality of data packets;

partially sorting, utilizing a circuit switch matrix connected between said plurality of input ports and said plurality of merged buffers, said plurality of data packets according to said output port destinations;

routing each of said data packets to the one of said merged buffers which is connected to the one of said output ports which corresponds to said output port destination of said data packet if said merged buffer is not busy;

resolving contention among said plurality of data packets for any of said output ports by misrouting all but the first contending one of said data packets to those of said merged buffers that are not busy;

assigning a misrouted number to each of said misrouted data packets;

rerouting, using a plurality of feedbacks between said plurality of merged buffers and said circuit switch matrix, from said merged buffers those of said data packets which have been misrouted, wherein each of said feedbacks is connected to a corresponding one of said merged buffers;

providing a content-addressable memory means connected to said circuit switch matrix and said plurality of merged buffers for routing said plurality of data packets between said circuit switch matrix, said merged buffers, and said output ports;

tracking and storing in said content-addressable memory means the location within said plurality of merged buffers of each of said data packets;

identifying by utilizing said sequence number the next one of said data packets to be sent to each of said output port destinations;

identifying which of said data packets located in said merged buffers have been misrouted;

identifying by utilizing said misrouted number the next one of said misrouted data packets to be rerouted;

indicating when each of said misrouted ones of said data packets has subsequently been rerouted;

rerouting to said circuit switch matrix said misrouted ones of said data packets according to said misrouted number and said output port destination;

accepting rerouted ones of said data packets into said circuit switch matrix; and routing each of said plurality of data packets according to said sequence number and said output port destination from said plurality of merged buffers to said plurality of output ports.

29. The method of claim 28, further including, in combination, the steps of:

creating an internal routing header for each of said data packets;

identifying and storing in said internal routing header a priority for said data packet;

identifying and storing in said internal routing header the output port destination of said data packet;

storing in said internal routing header said sequence number of said data packet; and relaying said data packet to said merged buffers according to said internal routing header.

30. The method of claim 29, further including, in combination, the steps of:

identifying and storing in said content-addressable memory means said priority of said data packet; and routing each of said data packets from said plurality of merged buffers to said plurality of output ports according to said priority.

31. The method of claim 30, further including the steps, in combination, of:

clocking with a speedup factor of at least 2;

writing said data packets to said merged buffers during the first part of a time slot;

rerouting said misrouted ones of said data packets during the second part of a time slot; and writing the correctly routed ones of said data packets to said output ports during the first part of a subsequent time slot.

32. The method of claim 31, further comprising the step of controlling said data packet entry into said circuit switch matrix through an input tristate connected between each of said input ports and said circuit switch matrix and through a feedback tristate connected between each of said feedbacks and a point between a corresponding one of said input tristates and said circuit switch matrix.

33. The method of claim 32, further comprising the steps of:

increasing said sequence numbers sequentially per said priority and said output port destination to a preset maximum sequence number;

subsequently starting said sequence numbers over at the first of said sequence numbers;

increasing said misrouted numbers sequentially per said output port destination to a preset maximum misrouted number; and subsequently starting said misrouted numbers over at the first of said misrouted numbers.

34. The method of claim 33, further comprising the step of aborting said rerouting of any of said misrouted data packets if said misrouted data packet is in one of said merged buffers from which a misrouted one of said data packets has already been read during the same time period.

35. The method of claim 34, further comprising, in combination, the steps of:

tracking the utilization of said not busy ones of said merged buffers; and changing the order in which said not busy ones of said merged buffers receive said misrouted data packets.

36. The method of claim 34, further including the step of minimizing overflow of said merged buffers by the steps, in combination, of:

comparing said sequence number of said rerouted data packet entering one of said merged buffers during the second half of a time slot to said sequence number of said correctly routed data packet leaving said merged buffer during the subsequent first half of a time slot;

calculating the absolute difference between said sequence numbers; and not admitting additional ones of said rerouted data packets to said merged buffer until said absolute difference is less than a preset back pressure parameter.

37. The method of claim 34, further including steps for multicasting.

38. The method of claim 37, wherein said steps for multicasting comprise, in combination:

assigning one of said misrouted numbers to a multicast data packet, said multicast data packet being one of said data packets with more than one of said output port destination;

routing said multicast data packet to one of said merged buffers that did not receive a correctly routed one of said data packets;

rerouting said multicast data packet to multiple ones of said merged buffers during the second half of a time slot, said multiple ones of said merged buffers corresponding to said more than one output port destinations;

identifying not busy ones of said merged buffers after one of said multicast data packets has been rerouted to said merged buffers corresponding to said output port destinations; and rerouting additional ones of said misrouted data packets to said not busy merged buffers during the same second half of a time slot.

39. The method of claim 34, further comprising the step of minimizing overflow of said plurality of merged buffers by the steps of, in combination:

setting a predetermined buffer occupancy threshold for each of said priorities, said predetermined buffer occupancy threshold being lowest for the lowest of said priorities and highest for the highest of said priorities; and discarding said data packets according to said priority before said data packets enter one of said merged buffers, said discarding occurring when the number of said data packets in said merged buffers reaches said predetermined buffer occupancy threshold, said discarding occurring in such a manner that said data packets with a lower of said priority are discarded first.

40. A method for concurrently routing each given one of a plurality of signals to a selected one of plural output data pathways in accordance with a destination address comprising the steps of, in combination:

concurrently receiving said signals at a plurality of input ports;

providing a plurality of buffers, each capable of storing at least one of said signals and each provided with a signal input and further provided with a signal output connected to a corresponding one of said output data pathways;

identifying the destination buffer connected to the one of said output data pathways specified by said destination address;

routing said given signal to said destination output buffer for immediate transfer to said destination output data pathway when said destination buffer is not busy;

misrouting and temporarily storing said given signal in one of said plurality of buffers that is not busy when said destination buffer is busy; and transferring the misrouted and temporarily stored signal to said destination buffer when said destination buffer becomes not busy.

41. The method of claim 40, further including the steps, in combination, of:

providing as part of said switching means a circuit switch fabric connected between said plurality of input ports and said plurality of buffers for relaying said plurality of signals to said buffers according to said destination address; and partially sorting, utilizing said circuit switch fabric, said plurality of signals according to said destination addresses.

42. The method of claim 41, further including the step of using a plurality of feedbacks between said plurality of buffers and said circuit switch fabric to reroute from said buffers those of said signals which have been misrouted, each of said feedbacks being connected to a corresponding one of said buffers.

43. The method of claim 42, further including the step of routing said plurality of signals between said switching means, said buffers, and said output data pathways using a control means.

44. The method of claim 43, further including the step of tagging each of said misrouted input signals.

45. The method of claim 44, further including the steps of, in combination:

providing as part of said control means a content-addressable memory;

tracking and storing in said content-addressable memory the location within said plurality of buffers of each of said signals;

identifying the next one of said signals to be sent to said destination address;

identifying which of said signals located in said buffers have been misrouted;

identifying the next one of said misrouted signals to be rerouted; and indicating when each of said misrouted ones of said signals has subsequently been rerouted.

46. The method of claim 45, further including the steps of, in combination:

tracking the utilization of not busy ones of said plurality of buffers; and cycling the order in which said not busy ones of said buffers receive said misrouted signals.

47. The method of claim 40, further including steps for multicasting.

48. The method of claim 45, further including steps for multicasting.

* * * * *

UNITED STATES PATENT AND TRADEMARK OFFICE
CERTIFICATE OF CORRECTION

PATENT NO. : 5,862,128
DATED : January 19, 1999
INVENTOR(S) : Michael Cooperman et al.

It is certified that error appears in the above-identified patent and that said Letters Patent is hereby corrected as shown below:

On title page, item 73 Assignee
replace "Blank Space"
with --GTE Laboratories Incorporated, Waltham, Massachusetts--.

Signed and Sealed this

Thirty-first Day of August, 1999

Attest:

Q. TODD DICKINSON

*Attesting Officer*     *Acting Commissioner of Patents and Trademarks*